United States Patent
Verfaillie et al.

(10) Patent No.: US 9,993,737 B2
(45) Date of Patent: Jun. 12, 2018

(54) CONSTRUCTING SOCIAL NETWORKS USING MONITORED GAME PLAY

(71) Applicant: Amazon Technologies, Inc., Seattle, WA (US)

(72) Inventors: David Hendrik Verfaillie, Laguna Beach, CA (US); Michael Anthony Willette, Lake Forest, CA (US); Michael Donges, Trabuco Canyon, CA (US); Zane Lyon, Corona, CA (US)

(73) Assignee: Amazon Technologies, Inc., Seattle, WA (US)

( * ) Notice: Subject to any disclaimer, the term of this patent is extended or adjusted under 35 U.S.C. 154(b) by 68 days.

(21) Appl. No.: 15/199,683

(22) Filed: Jun. 30, 2016

(65) Prior Publication Data
US 2018/0001209 A1    Jan. 4, 2018

(51) Int. Cl.
  *A63F 13/12*    (2006.01)
  *A63F 13/795*   (2014.01)
  *A63F 13/35*    (2014.01)

(52) U.S. Cl.
  CPC ............ *A63F 13/795* (2014.09); *A63F 13/35* (2014.09)

(58) Field of Classification Search
  CPC .................................................. A63F 13/12
  See application file for complete search history.

(56) References Cited

U.S. PATENT DOCUMENTS

2009/0075738 A1*  3/2009  Pearce .................... G07F 17/32
                                                            463/42
2013/0165234 A1*  6/2013  Hall ........................ A63F 13/00
                                                            463/42

OTHER PUBLICATIONS

Sneed, Harry M. "Encapsulation of legacy software: A technique for reusing legacy software components." *Annals of Software Engineering* 9 (2000) 293-313.
Witten et al. Data Mining: Practical Machine Learning Tools and Techniques (3d Ed.) (Jan. 20, 2011).

* cited by examiner

*Primary Examiner* — Omkar Deodhar
(74) *Attorney, Agent, or Firm* — Knobbe Martens Olson & Bear LLP (57) ABSTRACT

Features are described to use data from game play to construct social networks of users. For example determining that a user played a game with a certain player, a certain number of times, can indicate compatibility between the user and the player. The compatibility may suggest the potential for a social network connection between the user and the player. Social network connections could be within the particular game platform, or the connection may be outside the game such as via other social networking platforms. In addition, a type of connection via the service may be identified. For example, some services allow users to follow or friend other users, where each type of connection is associated with different data security features.

20 Claims, 7 Drawing Sheets

CONSTRUCTING SOCIAL NETWORKS USING MONITORED GAME PLAY

BACKGROUND

A social network generally refers to a collection of social connections between two or more users. Each social connection includes a link between two or more users via a service such as a social networking site (e.g., FACEBOOK®, INSTAGRAM®, MEETUP®), a club or other organization (e.g., TOASTMASTERS®, IEEE®), or a gaming platform (e.g., TWITCH®, STEAM®, etc.).

Within a service, the network of social connections formed between the users of the service can provide valuable insights into users' preferences and habits. Within a social network, new connections can be identified through analysis of the social network. For example, analysis may identify new social connections between unconnected users having social connections with a common user. However, the ability to increase the size of the social network and the number of social connections included in the social network using social network analysis can be limited.

BRIEF DESCRIPTION OF THE DRAWINGS

Embodiments of various inventive features will now be described with reference to the following drawings. Throughout the drawings, the examples shown may re-use reference numbers to indicate correspondence between referenced elements. The drawings are provided to illustrate example embodiments described herein and are not intended to limit the scope of the disclosure.

DETAILED DESCRIPTION

One way to increase the quantity and quality of information available to identify and maintain social networks is through the use of game play information. The games that people play can provide information about the players. Chess is a widely known game and is thought to be at least 1500 years old. Gaming technology has advanced significantly since the first games of chess were played. Substantial changes in gaming arose with the advent of video games and the Internet. Through network-based, electronic games, massive worlds are created with vibrant economies that allow users to interact in fantasy realms across a variety of genres. The interactions may include cooperative (or combative) play with other users located virtually anywhere in the world.

While playing a game, a user generates a variety of game play information. The game play information may be provided actively in response to prompts from the game. Actively provided game play information may include game preferences, game survey responses, game registration information (e.g., name, location, address, etc.), in-game character features, and the like. Game play information may include information about the game features a user employs while playing the game. For example, a game may include in-game features such as voice chat, video chat, text chat, in-game messaging, mapping, game modifications, or the like. Game play information may include a user's performance during the game. For example, in a game of soccer, the style of play for a user may be determined from the user's in-game behavior (e.g., how the user maneuvers an in-game character; virtual items acquired within the game, etc.). The skill of play may be determined based on victories or other game achievements (e.g., character level, game level, etc.), opponent skill level, etc. Game play information may also include information from outside of the game such as the accessories used by the player while playing the game (e.g., microphone, headset, virtual reality goggles, dual monitors, haptic chair, mouse, keyboard, etc.), the times the user plays the game, or the locations where the user plays the game.

Some games allow for team play. In team play, two or more users are grouped to play the game. The grouping of members on a team represents additional game play information. For a given team, the game may track the number of victories achieved, level achieved, collective skill level, or in-game goals achieved. The game play information for a user or a team may be associated with a game session. The game session generally refers to a period of time for which game play information is collected. A game session may be started when a user accesses the game and terminate when the user exits the game. In some implementations, the game session may be delimited based on a number of days, or in-game time such as a number of levels of the game played, amount of time the game is played, or other detectable indicator of time.

Through complex analysis of the game play information of team members, to identify ways to expand a social network for users may be identified. For example, users who often play a game together and have enjoyed success within the game have a common bond within the game. These users may also be active users of a third party service such as a social networking site, club, organization, or gaming platform. Based on analysis of the game play information for users who have a common in-game bond, the described features may identify additional social connections, beyond the game, between users, and thus, grow the social network for a user. In some implementations, the additional social connection may be a connection via a different game that the users can play together.

Figure 1:
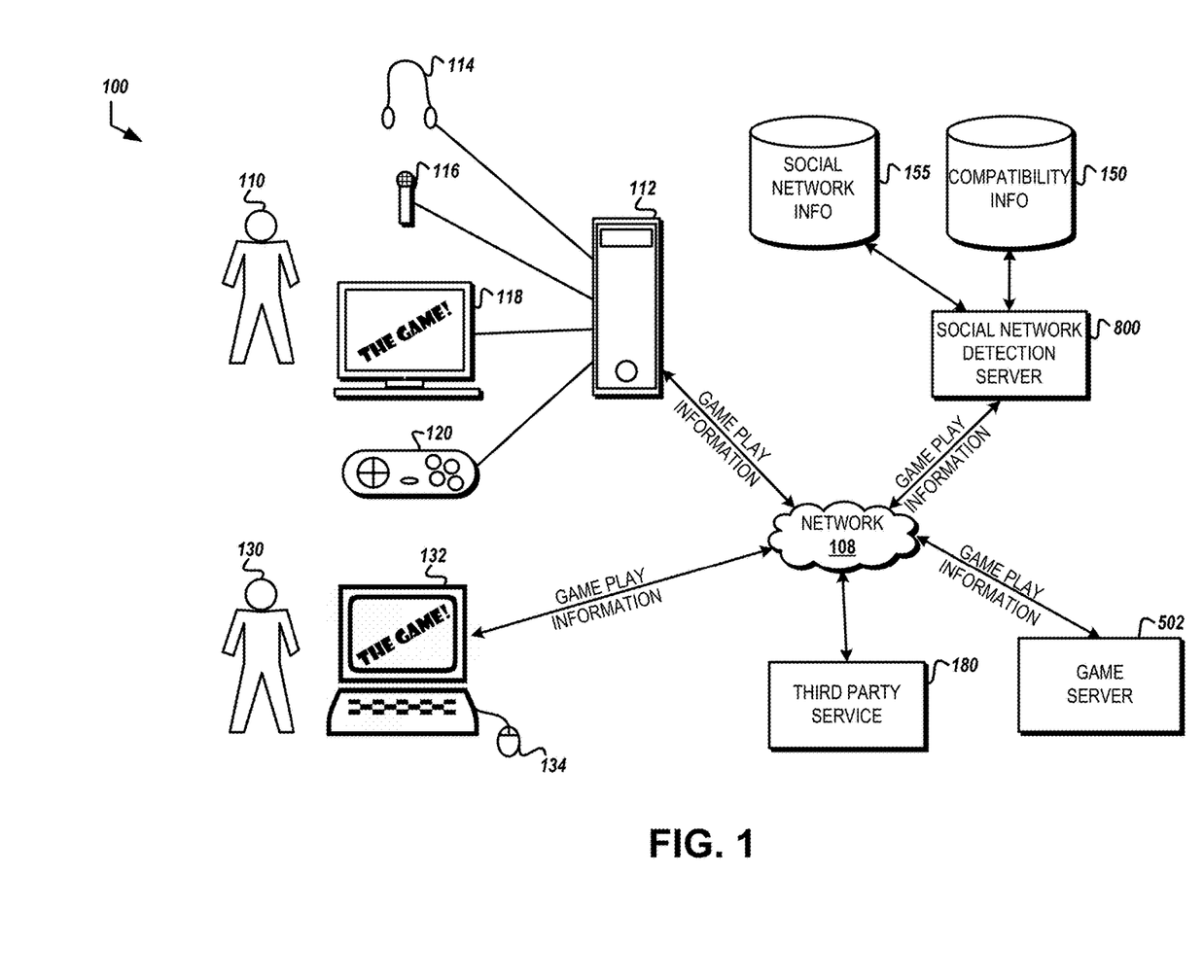
FIG. 1 is a pictorial diagram depicting an illustrative environment in which a social network detection server is used to identify and maintain social network information for a user based on game play information.

FIG. 1 is a pictorial diagram depicting an illustrative environment in which a social network detection server may be used to identify and maintain social network information for a user based on game play information. The environment 100 shown in FIG. 1 includes a first client gaming device 112 for a first user 110. The environment 100 also shows a second client gaming device 132 for a second user 130. The first user 110 and the second user 130 are shown as playing the same game via their respective client gaming devices. The first client gaming device 112 may be coupled with a variety of gaming accessories such as headphones 114, a microphone 116, a display 118, and a game controller 120. The second client gaming device 132 is shown as being coupled with a mouse 134. Although not shown in FIG. 1, the environment 100 may include hundreds or thousands of other users, each having their own client gaming device and gaming accessories in use while playing the game.

A client gaming device may be configured to exchange messages with another client gaming device, a game server 502, a third party service 180, and/or a social network detection server 800. The messages may include game play information for a user. The messages may be formatted according to a standardized protocol such as TCP/IP, HTTP, FTP, or the like. The transmission may be sent via a network 108. The network 108 may include wired, wireless, or hybrid wired-wireless networks. A client gaming device may be implemented as an appliance, a personal computing device, a laptop computing device, a hand held computing device, a terminal computing device, a mobile device (e.g., mobile phones or tablet computing devices), a wearable device configured with network access and program execution capabilities (e.g., "smart eyewear" or "smart watches"), a wireless device, an electronic reader, a media player, a home entertainment system, a gaming console, a set-top box, a television configured with network access and program execution capabilities (e.g., "smart TVs"), a combination of one or more of the foregoing, or some other electronic device or appliance.

The client gaming device may include memory storing instructions to configure the client gaming device to play the game. In some implementations, the instructions may be provided by the gaming server 502. Information about the game (e.g., locations of virtual object, directory of users playing the game, in-game objectives, game results, etc.) may be stored by the game server 502 and provided to client gaming devices such as in response to a request message from the client gaming device. The game server 502 may support one or more games (e.g., different genres of games).

In some implementations the client gaming device may be configured to communicate with the third party service 180. The third party service 180 may include a social networking service such as FACEBOOK, MYSPACE®, TWITTER, INSTAGRAM, and the like. The third party service 180 may be accessed via software executing on the client gaming device. The software may execute concurrently with the game. In some implementations, the third party service 180 may be accessed via the game. For example, a game may provide a feature to access an image sharing service from the game. The game may provide such access by a control element included in the game that communicates via an application programming interface (API) with the image sharing service. As the user utilizes the client gaming device to capture images during game play, the images may be transferred to the image sharing service. In such implementations, the user may provide account information for accessing the third party service 180 via an interface of the game. For example, a preferences interface may include data entry interface control elements for receiving username and login information for the third party service 180 for the user.

The social network detection server 800 may receive the game play information for a user. The game play information may be received directly from a client gaming device. For example, the client gaming device may be configured to transmit game play information to the social network detection server 800 during or after game play. In some implementations, the social network detection server 800 may be integrated with the game server 502. In such implementations, the social network detection server 800 may be implemented as a gateway to the game server 502. The gateway may store the game play information for social network analysis, as described below. The integration may be via a data storage device. For example, the game server 502 may store the game play information in the data storage device. The social network detection server 800 may then access the game play information from the data storage device.

The social network detection server 800 may be configured to analyze the game play information to maintain social network information. The social network information may be stored in a social network information data storage 155. The social network information may include the connections between users. The social network detection server 800 may identify, based on game play information, compatible users. The compatibility may be determined based on a compatibility profile stored in a compatibility information data storage 150. A compatibility profile may identify which aspects of game play information for a game to use when assessing whether two users should be connected. In some implementations, the compatibility profile may identify thresholds or specific comparisons of game play information to use for identifying compatible users. For example, a compatibility profile for the first user 110 and the second user 130 playing a game together may identify a minimum number of times the first user 110 and the second user 130 played together and a minimum number of times they have met an in game achievement (e.g., target score, win, target progress in the game, etc.). If the conditions in the compatibility profile are satisfied, then the users may be deemed compatible. In some implementations, the compatibility may be expressed as a compatibility score indicating a degree of compatibility for two players. The social network detection server 800 may generate the compatibility score using the compatibility profile. Once compatible users are identified, the social network detection server 800 may update the social network to include a social connection between the first user 110 and/or the second user 130. Because the social network includes social connections between various users, a social network may be visualized as a social network graph.

Figure 2:
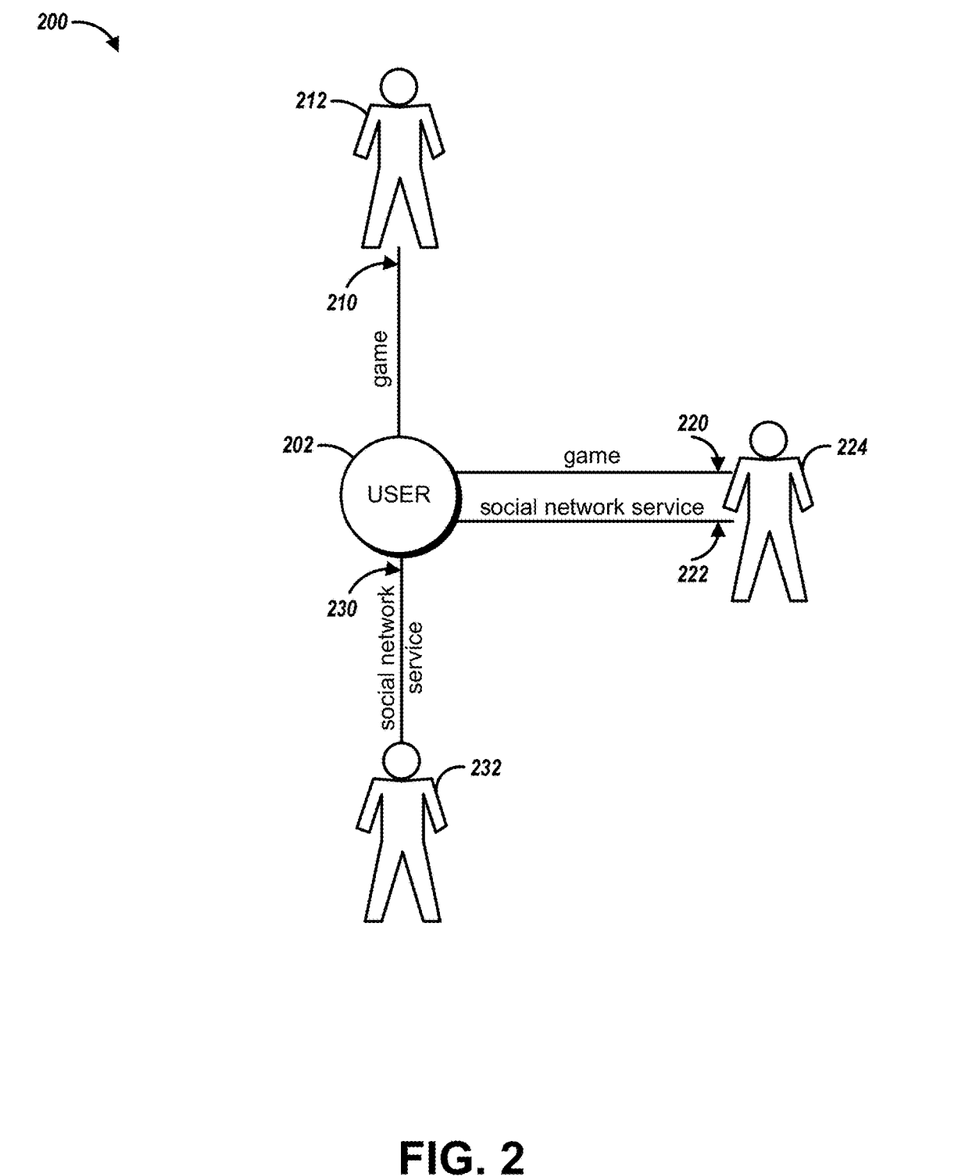
FIG. 2 is a pictorial diagram of an example of a social network.

FIG. 2 is a pictorial diagram of an example of a social network graph. In FIG. 2, the social network graph 200 is a representation of the social network for a user 202. The user 202 is connected to three other users—first connected user 212, second connected user 224, and third connected user 232. The user 202 has one connection 210 with the first connected user 212. As shown in FIG. 2, the connection 210 is via the game. The user 202 has two connections (e.g., connection 220 via the game and connection 222 via a social network service) with the second connected user 224. The user 202 also has one connection 230 with the third connected user 232 via a social network service.

As the user 202 continues to play the game with the first connected user 212, the social network detection server 800 may determine, based on the generated game play information, that the user 202 is compatible with the first connected user 212. In such instances, a second connection may be identified and included in the social network between the user 202 and the first connected user 212.

Connections within a social network may include a connection type. The connection type indicates a degree of connectedness for the users. For example, if two users casually play a game together infrequently, it may be desirable to include a lower degree of connectedness than a connection between two users who play together every day. In some social networking services, the connections may be identified using terms like "fan," "follower," "friend," "family" whereby each is associated with a degree of connectedness or "social distance." The type of connection may allow differing levels of data sharing based on how closely the users are connected.

In the implementations described, where a social connection between users is identified, the identification of a social connection may include identifying the connection type. The connection type may be associated with a compatibility score generated for users based on their game play information. Table 1 provides a representation of a look-up table that may be used to determine the connection type for corresponding ranges of compatibility scores where a score of 0 indicates is no compatibility and 100 is the highest compatibility score.

TABLE 1

| Compatibility Score Range | Connection Type |
| --- | --- |
| 0-50 | No Connection |
| 51-75 | Fan |
| 76-89 | Follower |
| 89-100 | Friend |

Figure 3:
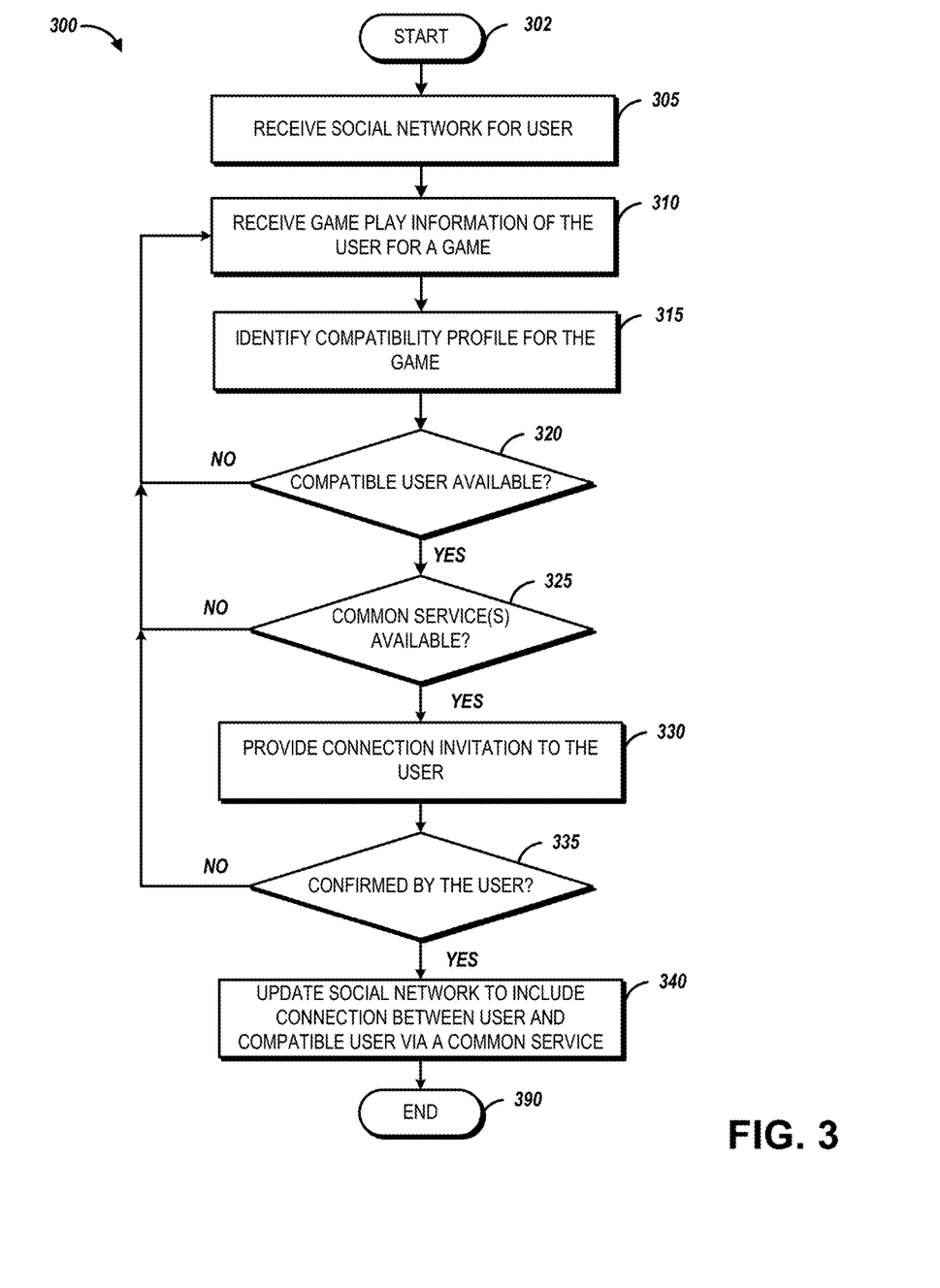
FIG. 3 is a flow diagram depicting an illustrative routine executed by the social network detection server for identifying and updating a social network for a user based on game play information.

FIG. 3 is a flow diagram depicting an illustrative routine executed by the social network detection server for identifying and updating a social network for a user based on game play information. The process 300 demonstrates one way in which the game play information may be processed to identify compatible users and maintain a social network, such as that shown in FIG. 2. The process 300 may be implemented in whole or in part by a social network detection server such as the social network detection server 800 shown in FIG. 1.

The process 300 starts at block 302. The process 300 may begin with initiating the social network detection server 800 to receive game play information. This may include activating a gateway including the social network detection server 800. Starting the process 300 may include reading configuration values for the social network detection. The configuration values may identify data storage locations (e.g., address, port), data storage access information (e.g., username, password, protocol, supported query language(s)), and the like.

At block 305, the social network detection server 800 receives data regarding a social network for a user. The data may be received from the social network information data storage 155. To retrieve the social network information, the social network detection server 800 may include an identifier for the user in a query message transmitted to the social network information data storage 155. In some implementations, the social network information may include information for the user and the social connections for the user. In some implementations, the social network includes multiple users and the connections for each user.

In some implementations, the social network information data storage 155 (or other storage device of a gaming system) may store a profile for a user of the game. The profile may include information to access an account on a third-party service for the user. For example, the user may provide information, such as credential information, to allow the game to access the third-party service via an application programming interface (API). One example may be to store information in the user's game profile for accessing their FACEBOOK account. In some implementations, the social network information for the user may be accessed on demand, for example using API calls. In some implementations, the social network information for the user may be transferred from the third-party service for storage in the social network information data storage 155. The access information stored in the profile may include a username for the third-party service account, password, authorization token, or other information to access the social network information for the user from the third-party service.

At block 310, game play information for the user of a game is received. The game play information may be received at the social network detection server 800 from a client gaming device as a user accesses and interacts with the game. One example of such a client gaming device is described in FIG. 4. Game play information may be received from a game server hosting the game and/or a server streaming the game.

Figure 4:
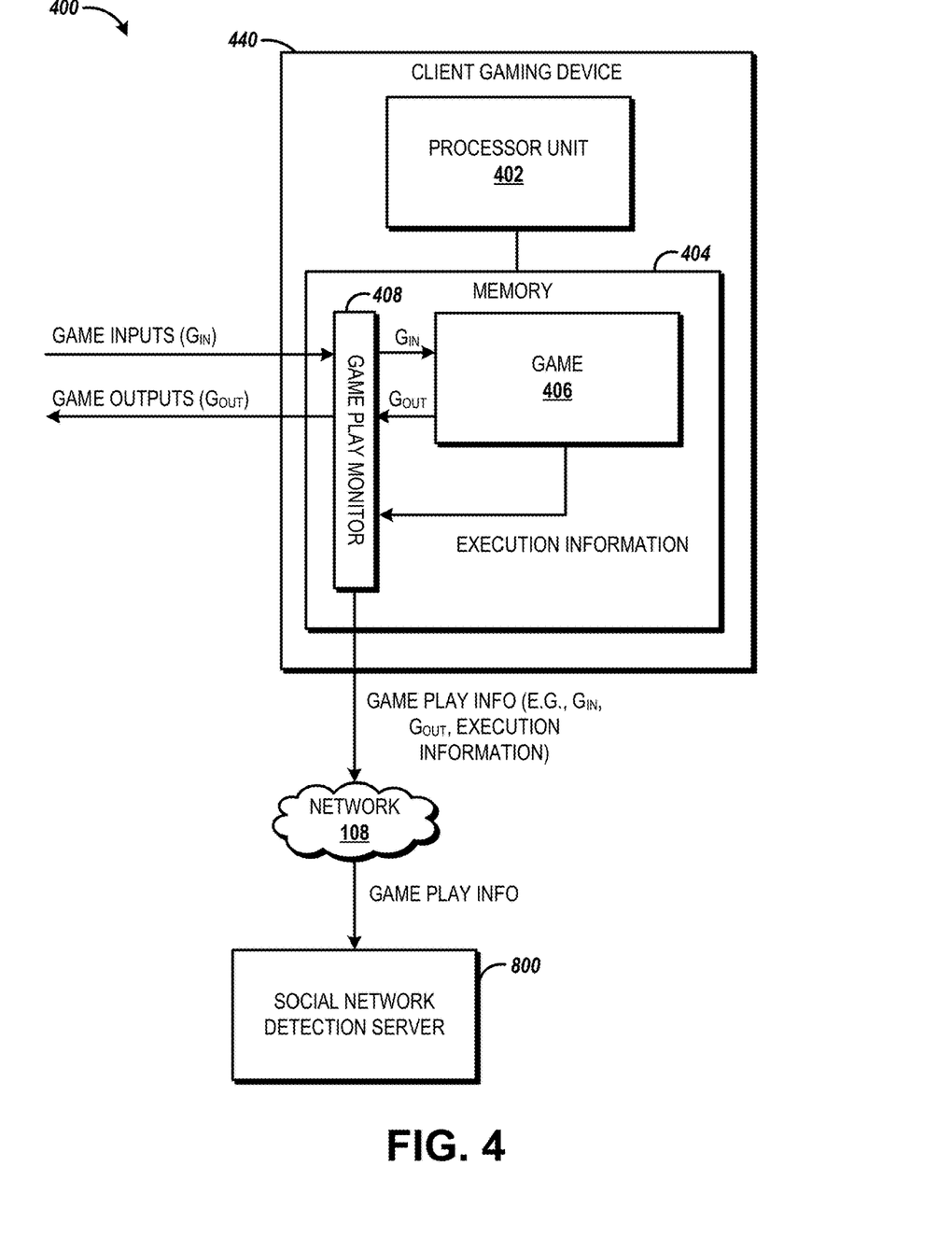
FIG. 4 is a block diagram depicting illustrative components of an embodiment of a gaming system including a client gaming device configured to provide game play information to a social network detection server.

FIG. 4 is a block diagram depicting illustrative components of an embodiment of a gaming system including a client gaming device configured to provide game play information to a social network detection server. The gaming system 400 shown in FIG. 4 is a simplified example in which extraneous elements have been omitted to focus the reader on specific features discussed. Elements may be added, removed or modified without departing from the intended scope of what constitutes a gaming system and/or a client gaming device.

The gaming system 400 includes a client gaming device 440. The client gaming device 440 may be in data communication with the social network detection server 800 via the network 108 as discussed above with reference to FIG. 1.

The client gaming device 440 may include a processor unit 402 and a memory 404. The processor unit 402 may be included to coordinate the functions of the client gaming device 440. For example, the processor unit 402 may be configured to coordinate the process of executing a game 406. The game 406 may be implemented as machine executable instructions stored in the memory 404. The instructions cause the client gaming device to present interfaces, receive control commands, and identify game state changes based on, for example, the received control commands. The game 406 may receive game inputs ($G_{IN}$). Game inputs include information from a user during execution the game. The game inputs may be provided during configuration of the game such as setting preferences for the game (e.g., audio, video, color, character, game mode preferences, game map preferences, etc.). The game inputs may be provided during game play such as commands to move an avatar within the game, to create a team with one or more other users, of to use an in-game feature (e.g., chat, audio link, etc.). In some implementations, game inputs may be aggregated and/or summarized. For example, in a multiplayer battle game, if a user provides game inputs that lead to a kill, the user's in-game personality may be characterized as an aggressive player. On the other hand, if a user provides game inputs to deliver supplies or heal players during the game, the user's in-game personality may be characterized as a support player. The characterization may be provided by processing the game inputs with a classifier model to generate a classification of a user's game inputs for a game.

The game inputs may include audio or text chat information received by the game. Where the game input is directed to a specific user, user information of the specific user may be stored. In this way, a count of the number of time a user provides a game input for the specific user may be maintained and used for compatibility assessment.

The responses generated to game inputs may be referred to as game outputs ($G_{OUT}$). Game outputs may include an award provided for a predetermined sequence of game inputs (e.g., points, wins, experience level, etc.) or prompts for corrective action (e.g., error messages, configuration validation errors, etc.). Game outputs may include statistics for a game session such as the number of steps a player took during the game session. Game outputs may include the result of voting for a game session. For example, at the end of a game session, the players may be polled to identify the most valuable player. The votes may be received by the game and the player receiving the most votes may be named the most valuable player. This result may be a game output.

In the implementation of the client gaming device 440 shown in FIG. 4, a game play monitor 408 is also provided as machine executable instructions stored in the memory 404. The game play monitor 408 may be configured as an intermediate between the input and output devices and the game 406. In such a configuration, the game play monitor 408 may intercept transmissions including the game inputs and game outputs for a user of the client gaming device 440. In some implementations, the game play monitor 408 may be implemented as a software wrapper for the game 406 such that the game 406 executes within the game play monitor 408. This configuration allows the game play monitor 408 to access game play information generated and received by the game 406. The game play information may also include execution information for the game 406. The execution information may include details about the execution of the game 406 such as information about the client gaming device executing the game 406 (e.g., platform, operating system, geographic location, network location, etc.), version information about the game 406, accessories attached to the client gaming device 440 during execution of the game 406, and other information detectable by the client gaming device 440 executing the game 406.

Collectively, the game inputs, game outputs, and execution information form the game play information for the user. The game play information may be transmitted from the client gaming device 440 to the social network detection server 800 for further analysis as described. In some implementations, the transmission may be from the game play monitor 408 included in the client gaming device 440. The transmission may be real time (e.g., as the game inputs, game outputs, or execution information are received by the game play monitor 408). In some implementations, it may be desirable to buffer the game play information for delayed transmission such as after game play is completed. Delaying may be desirable to reserve the resources (e.g., power, processing, network bandwidth, memory, etc.) of the client gaming device 440 for the game 406 rather than sending the game play information. In such implementations, the memory 404 may include a reserved block of memory to temporarily store game play information for later transmission. The delay may be dynamically assessed based on, for example, whether the user is actively playing the game, the resources available to the client gaming device, or other factor detectable by the game monitor 408

The monitoring of game play information shown in FIG. 4 allows games to be developed independent of the monitoring because the game, or a portion thereof, can be wrapped by the game play monitor to collect game play information. Wrapping generally refers to the process of encapsulating the game or a portion of the game (e.g., specific function, module, interface, transaction path, etc.) to allow the game play monitor to mediate communications to and from the wrapped feature. For example, the game may include an interface for receiving game inputs. The game play monitor may encapsulate this interface to add the game play information collection features described. Once the information is collected, the game play monitor may pass the received value to the interface for receiving game inputs. Sneed "Encapsulation of Legacy Software" *Annals of Software Engineering* 9 (2000) 293 provides a discussion of some encapsulation techniques that can be included and is incorporated by reference in its entirety.

Figure 5:
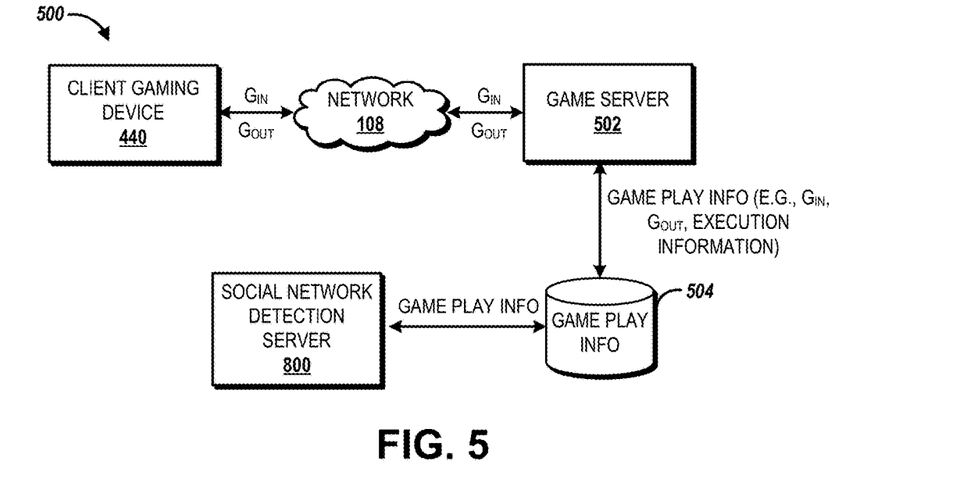
FIG. 5 is a block diagram depicting illustrative components of an embodiment of a gaming system for providing game play information to a social network detection server via a gaming server.
Figure 6:
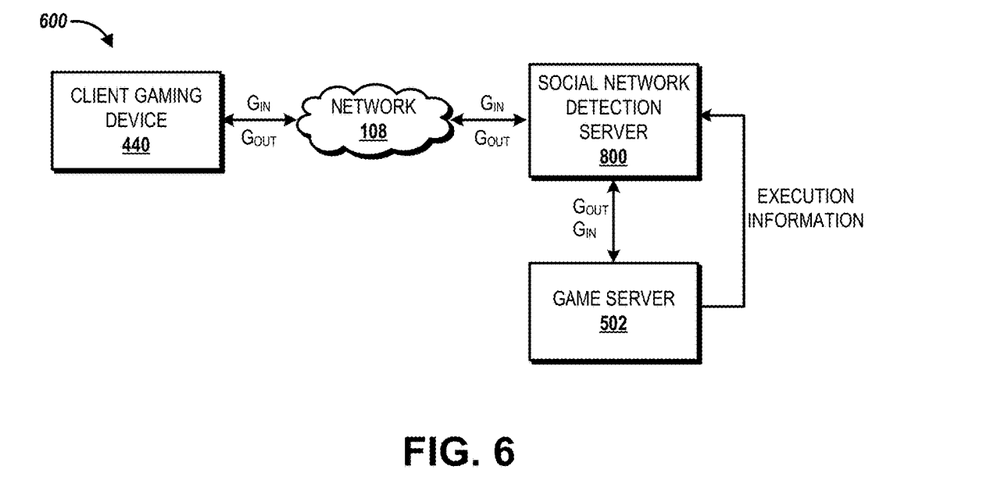
FIG. 6 is a block diagram depicting illustrative components of an embodiment of a gaming system including a social network detection server collecting game play information transmitted to or from a gaming server.

It may be desirable for certain games and/or client gaming devices to avoid the additional processing related to game play information monitoring at the client gaming device. As such, in some implementations, the monitoring of the game play information may be performed outside the client gaming device 440 by another device or service. FIGS. 5 and 6 each show an embodiment where monitoring of game play information is performed outside the client gaming device 440.

FIG. 5 is a block diagram depicting illustrative components of an embodiment of a gaming system for providing game play information to a social network detection server via a game server. The gaming system 500 may be used for hosted games whereby the game server 502 coordinates all or a portion of the game. In such implementations, the game server may receive the game inputs and generate the game outputs. The inputs and outputs are exchanged with the client gaming device 440 using messages transmitted via the network 108.

In the implementation shown in FIG. 5, the game server 502 may store the game play information (e.g., $G_{IN}$, $G_{OUT}$, and execution information) in a game play information storage 504. The social network detection server 800 may access the game play information from the game play information storage 504. As shown in FIG. 5, the social network detection server 800 is directly accessing the game play information storage 504. In some implementations, the access may be via the network 108.

The gaming system 500 shown in FIG. 5 may be desirable to provide batch processing of game play information for social network detection. The game play information may be accessed according to a schedule. For example, a predetermined time and day may be identified for obtaining the game play information from the game play information storage 504.

In some implementations, the game play information may be accessed based on available resources for the gaming system 500 or a component included therein (e.g., the social network detection server 800 or the game play information storage 504 or the game server 502). For example, it may be desirable to determine a number of active users playing the game and, if the number is above a threshold, defer accessing the game play information storage 504 so as to avoid impacting the resources available for game play.

The accessing of game play information and social network analysis may be based on a request received by the social network detection server 800. For example, a request to update the social network for a specified user may be received by the social network detection server 800. In some implementations, the social network detection server 800 may acquire game play information based on time or date information the game play occurred. This can provide a way to limit the amount of game play information processed by the social network detection server 800 to the most recent game play information or the game play information received since the social network detection server 800 last analyzed the game play information.

In some implementations, the game play information may be accessed based on a triggering event detected by the system 500. For example, the game server 502 may be implemented as a virtual game server. In such instances, the game server 502 may be instantiated to support one or more game sessions for a game. When the game session is completed, the instance of the game server 502 may not be needed. An unused instance of a virtual game server may be removed. As part of removing the virtual instance, the game server 502 may transmit a message causing the social network detection server 800 to collect the game play information generated by the instance of the game server 502. The message may include information identifying what game play information was generated by the game server 502 such as a server identifier, time information, or the like. In some implementations, the triggering event may be the end of a game session (e.g., a match). When the game server 502 detects the end of the game session, the game play information for the match (or identifier therefor) may be provided in a message to the social network detection server 800.

FIG. 6 is a block diagram depicting illustrative components of an embodiment of a gaming system including a social network detection server collecting game play information transmitted to or from a game server. As with the gaming system 500 shown in FIG. 5, the gaming system 600 may be used for hosted games whereby the game server 502 coordinates all or a portion of the game. In the gaming system 600, the game server 502 may receive the game inputs and generate the game outputs. However, the game inputs and the game outputs are communicated through the social network detection server 800. In the gaming system 600 shown in FIG. 6, the social network detection server 800 acts as a gateway for game inputs and game outputs. The social network detection server 800 communicates with the client gaming device 440 via the network 108. The social network detection server 800 may be configured to pass through the game inputs and game outputs to the respective destinations (e.g., the game server 502 or the client gaming device 440). As shown in FIG. 6, the social network detection server 800 may also receive execution information from the game server 502. In some implementations, the execution information may be detected in one or more of the messages transmitted to or received from the client gaming device 440 and/or the game server 502. In some implementations, the social network detection server 800 may be configured to route the game inputs and game outputs to the appropriate destination based on, for example, a game identifier included in the received game message. This allows the social network detection server 800 to collect game play information for multiple games.

As shown in FIG. 6, the social network detection server 800 is directly coupled with the game server 502. In some implementations, the coupling may be via the network 108. This can allow, in certain configurations, provisioning of the social network detection features in a service oriented model whereby the social network detection server 800 services game play information from a variety of games hosted by a variety of game servers.

Returning to FIG. 3, having received, at the social network detection server 800, game play information for a user of a game, at block 315, a compatibility profile for the game is identified. The identification of a compatibility profile may include determining the game such as based on the game play information. Using an identifier for the game, the social network detection server 800 may query the compatibility information storage 150. In response, the social network detection server 800 may receive a compatibility profile for the game. The compatibility profile may be represented using a state machine, a script, a Boolean logic expression, or a machine learning model such as an artificial neural network model. The machine learning model may be configured to generate a compatibility score for two users based on game play information. The machine learning model may be trained using existing social network connections and historical game play information. Such a model can learn the aspects of game play information and compatible combinations that lead to the social network connections. Examples of building and training machine learning models are provided in Witten et al. DATA MINING: PRACTICAL MACHINE LEARNING TOOLS AND TECHNIQUES (3d ed.) (Jan. 20, 2011) which is hereby incorporated by reference in its entirety.

The model may take game play information and player identifiers as inputs and provide a compatibility score as an output. The determination at block 315 may include processing game play information for the first player and the second player with the model to obtain a compatibility score indicating the first player and the second player are compatible. The compatibility score generated by a model may be compared with a threshold or further processed to make a final compatibility assessment. In some implementations, different aspects of game play information may be compared. For example, an in-game compatibility score may be generated along with an out-of-game compatibility score. These scores may then be combined to generate a final compatibility score. Equation 1 below is one expression of how in-game and out-of-game compatibility scores may be combined.

$$s_{final} = \alpha(s_{ig}) + s_{og} \quad \text{Equation 1}$$

where $s_{final}$ is a final compatibility score for two users, $s_{ig}$ is an in-game compatibility score for the two users, $s_{og}$ is an out-of-game compatibility score for the two users, and $\alpha$ is a weighting value.

In some implementations, the determination at block 315 may utilize the raw game play information as received from the game server and/or client gaming device. In some implementations, the game play information may be processed before making the determination. For example, a classifier model may be used to classify a user's play style for a game. In this way, a large quantity of game play information for a user may be summarized into a more compact and memory efficient form. This also facilitates more efficient compatibility comparisons between users as the summarized form requires fewer resources to compare than a full comparison of the full set of raw game play information.

A compatibility score is one metric that can be used to determine whether users are compatible. In some implementations, the compatibility may be based on a compatibility matrix. The compatibility matrix may include two or more dimensions where each dimension represents a different compatibility measure (e.g., game play style, game preference, client device type, etc.). The value for a given cell within the matrix indicates the compatibility for users having the associated compatibility measures. In some implementations, the value may be binary (e.g., the users are compatible or the users are not compatible). In some implementations, the value may be expressed as a compatibility score indicating the probability of compatibility between the users. Equation 2 below is an example of a two-dimensional matrix for determining whether users having certain experience levels for a game are compatible. As shown in Equation 2, the columns of the matrix may be associated with three levels for a first player and the rows may be associated with three levels for a second player. The cells of the matrix include probabilities that the players at the corresponding levels would be compatible. The probabilities included in the matrix may be learned such as by analyzing the social network for players and their game play information.

$$\begin{bmatrix} 0.9 & 0.7 & 0.3 \\ 0.2 & 0.9 & 0.2 \\ 0.3 & 0.7 & 0.8 \end{bmatrix} \quad \text{Equation 2}$$

At block 320, the social network detection server 800 makes a determination as to whether a compatible user is available. The determination is based on processing of at least a portion of the game play information using the compatibility profile obtained at block 315. The determination may include parsing the game play information to identify game play information related to the user and one other user. In this way, the determination may be made for potential connections between the user and each of the other users with whom the user has played the game. The determination may include generating a compatibility metric (e.g., score) for the user and another user based on the game play information. The metric may then be compared to a threshold specified, for example, in the compatibility profile.

If the determination at block 320 is negative, the process 300 may return to block 310 to receive additional game play information for the user as described above. If the determination at block 320 is affirmative, at least one user is compatible with the user. At block 325, the social network detection server 800 determines whether a compatible service is accessible by the user and the compatible user. The determination may include accessing a profile for each user to determine the third party services with which each user has an account. For example, each user may have an account with an image sharing service. The profile may be established within the game such as via a configuration. In some implementations, the profile may be established via a gaming platform such as STEAM or TWITCH. If the user and the compatible user do not have a service in common, no social connection can be formed between the two users. In the event of such a negative determination, the process 300 may return to block 310 to obtain additional game play information. If the user and the compatible user have a common service, but are already linked in the social network by the common service, the process 300 may return to block 310 to obtain additional game play information. In such cases, the compatible users are already connected within the social network. However, if there is a common service and the user and compatible user are not connected in the social network via the common service, the process 300 proceeds to block 330 to provide a connection invitation to the user. In some cases the game service played by the user and the compatible user may maintain a social graph for users of the game service. For these users, there may be a service in common (e.g., the game service).

Providing a connection invitation to the user may include transmitting a message to a communication device of the user, such as the client gaming device. The message may include one or more of: an identifier for the compatible user or content included based on the game play information used as the basis to generate the invitation. The message may be transmitted by the social network detection server 800.

In some implementations, the compatibility invitation may be presented within the game interface. In such implementations, a communication channel may be established with the client gaming device and the invitation may be provided via the communication channel for presentation via the client gaming device. In some implementations, the compatibility invitation may be presented within an interface associated with the common service. In some implementations, the compatibility invitation may be presented via a messaging application such as an email, text message, chat, or instant messaging application.

Figure 7:
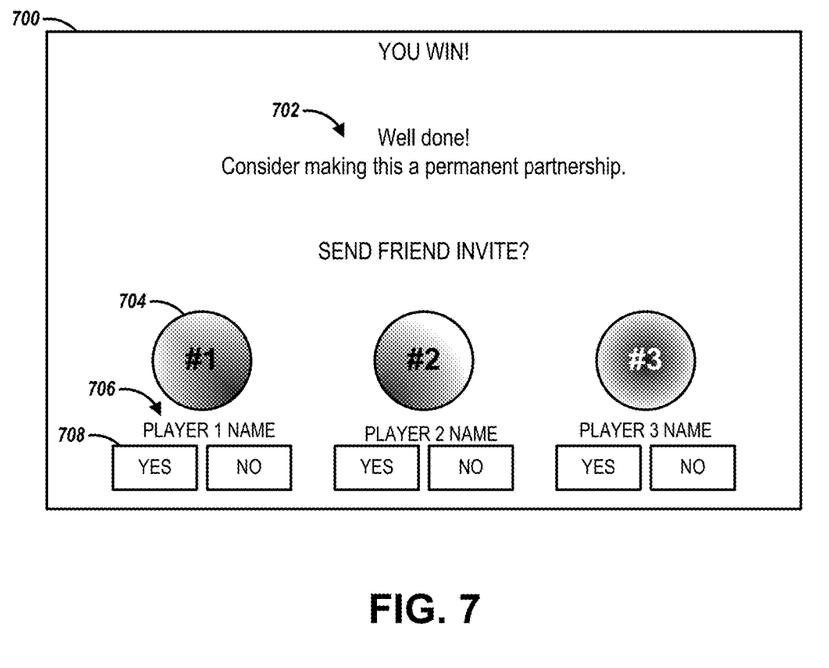
FIG. 7 is a pictorial diagram illustrating an example user interface for presenting compatibility invitations.

FIG. 7 is a pictorial diagram illustrating an example user interface for presenting compatibility invitations. The user interface 700 may be presented within the game or via another application executing on a device of the player. As shown in FIG. 7, the interface includes textual information 702. The textual information 702 may include content generated based on the game play information that created the compatibility invitation. The textual information 702 in FIG. 7 relates to success while playing a game. The user interface 700 may include a graphic 704 such as an avatar, icon, game screen capture, etc. for a compatible user. The user interface 700 may also include the compatible user's name 706. The name 706 displayed may be the compatible user's real-world name, in-game name, name used on a third party service, or some portion thereof.

Returning to FIG. 3, it may be desirable to confirm that the user indeed wants to be connected to the compatible user. At block 335, the social network detection server 800 may determine whether the user confirms the connection with the compatible user. The determination may include tracking a message responding to the compatibility invitation. The response message may be received by the social network detection server 800 from the user. If the message indicates that the invitation is declined, the response may be stored for use in future assessment of game play information. For example, a declined invitation from a user for a compatible user may exclude the compatible user from being recommended to the user in the future. If declined, the process 300 may return to block 310 to obtain additional game play information.

The confirmation may be performed via a user interface. For example, the user interface 700, shown in FIG. 7, may include control elements 708 to receive confirmation information indicating whether the compatibility invitation should be sent to the associated compatible user. As shown in FIG. 7, the control elements 708 are implemented as "YES" and "NO" buttons. Activation of the "YES" button may cause an invitation to be sent to compatible user "player #1." Activation of the "NO" button may cause the system to suppress further compatibility invitations for the compatible user "player #1."

Returning to block 335 of FIG. 3, if the connection invitation is confirmed, at block 340, the social network detection server 800 may update the social network for the user to include a connection between the user and the compatible user. The social connection may include an indication of the common service and, in some implementations, the type of connection. The update of the social network may include accessing an API of the common service. For example, the FACEBOOK social networking service provides an interface to programmatically send a friend request by transmitting a message via the API.

In some implementations, the social network detection server 800 may be configured to transmit an invitation message to the compatible user to establish the connection via the service. For example, if the social connection is via a third party service, the social network detection server 800 may transmit an invitation message via the third party service to the compatible on behalf of the user.

Figure 8:
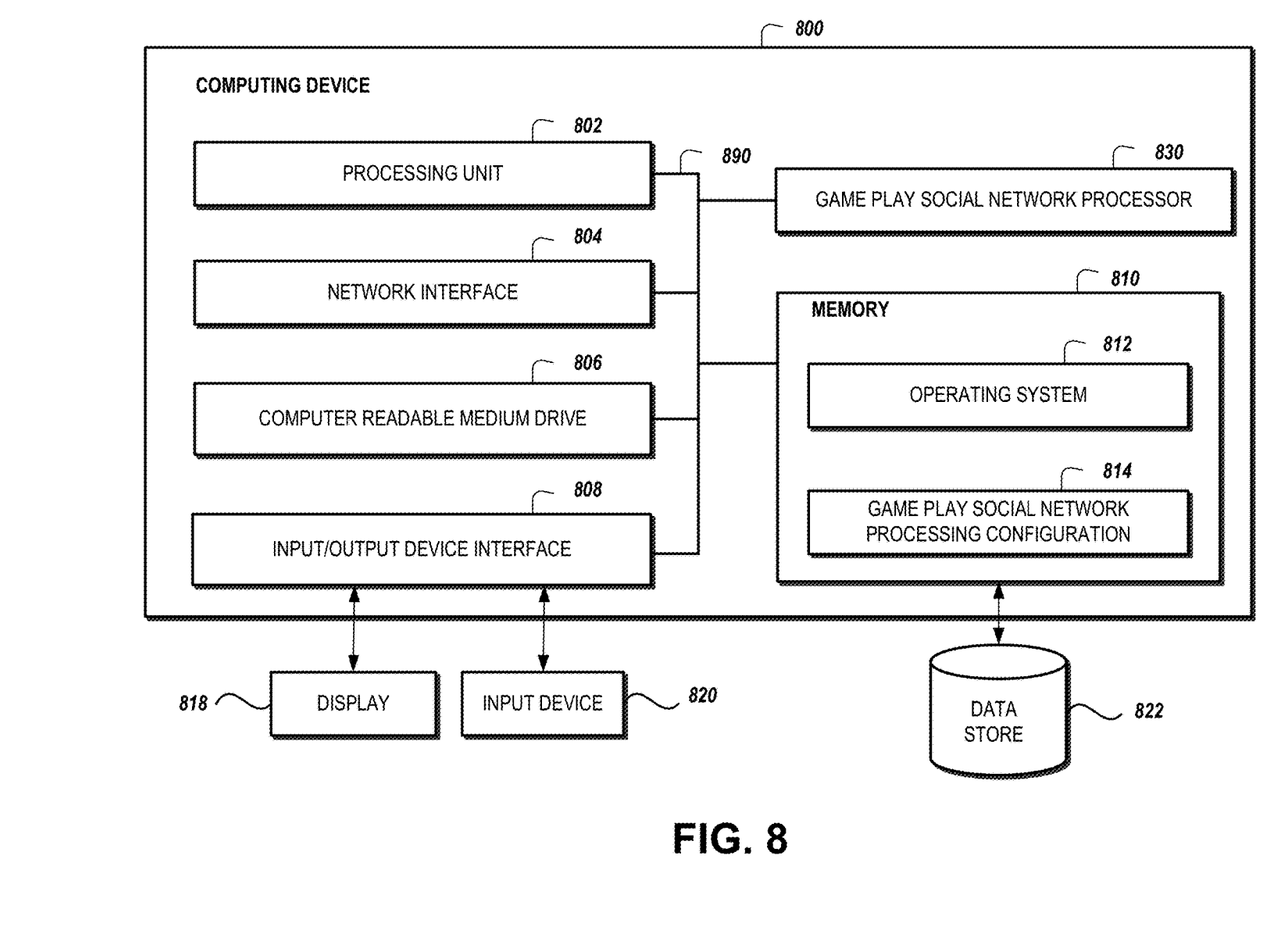
FIG. 8 is a block diagram depicting an illustrative computing device that can implement the social network detection server shown in FIG. 1, 4, 5, or 6.

FIG. 8 is a block diagram depicting an illustrative computing device that can implement the social network detection server shown in FIG. 1, 4, 5, or 6. The social network detection server 800 can be a server or other computing device, and can comprise a processing unit 802, a game play social network processor 830, a network interface 804, a computer readable medium drive 806, an input/output device interface 808, and a memory 810. The network interface 804 can provide connectivity to one or more networks or computing systems. The processing unit 802 can receive information and instructions from other computing systems or services via the network interface 804. The network interface 804 can also store data directly to memory 810. The processing unit 802 can communicate to and from memory 810 and output information to an optional display 818 via the input/output device interface 808. The input/output device interface 808 can also accept input from the optional input device 820, such as a keyboard, mouse, digital pen, microphone, mass storage device, game accessories (e.g., headphones, virtual reality goggles, joystick, game pad), etc.

The memory 810 contains computer program instructions that the processing unit 802 executes in order to implement one or more embodiments. The memory 810 may include RAM, ROM, and/or other persistent, non-transitory computer readable media. The memory 810 can store an operating system 812 that provides computer program instructions for use by the processing unit 802 or other elements included in the computing device in the general administration and operation of the social network detection server 800. The memory 810 can further include computer program instructions and other information for implementing a game and/or aspects of the social network detection based on game play information described in this application.

For example, in one embodiment, the memory 810 includes a game play social network processing configuration 814. The game play social network processing configuration 814 may include the thresholds, data sources, compatibility profiles, game play monitoring information, or other information used to obtain game play information and maintain social networks based on the game play information as described above. The game play social network processing configuration 814 may store specific values for a given configuration element. For example, the specific threshold value may be included in the game play social network processing configuration 814. The game play social network processing configuration 814 may, in some implementations, store information for obtaining specific values for a given configuration element such as from a network location (e.g., URL).

The memory 810 may also include or communicate with one or more auxiliary data stores, such as data store 822. The data store 822 may electronically store social network information, compatibility profile information, invitations generated by the social network detection server 800, responses to invitations received by the social network detection server 800, and the like.

The elements included in the social network detection server 800 may be coupled by a bus 890. The bus 890 may be a data bus, communication bus, or other bus mechanism to enable the various components of the computing device 800 to exchange information.

In some embodiments, the social network detection server 800 may include additional or fewer components than are shown in FIG. 8. For example, a social network detection server 800 may include more than one processing unit 802 and computer readable medium drive 806. In another example, the computing device 802 may not be coupled to a display 818 or an input device 820. In some embodiments, two or more social network detection servers 800 may together form a computer system for executing features of the present disclosure.

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations, or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a social network detection server or other hardware included in a gaming system. The social network detection server or other hardware included in a gaming system may include a digital signal processor (DSP), an application specific integrated circuit (ASIC), a field programmable gate array (FPGA), a microprocessor, a controller, microcontroller, or other programmable logic element, discrete gate or transistor logic, discrete hardware components, or any combination thereof. For such social network detection servers, devices used to implement the system are specially designed to perform the game play information collection, social network detection, and maintaining of social network data as described herein. A social network detection server may include electrical circuitry configured to process specific computer-executable to perform one or more of the features described herein. In embodiments where the social network detection server includes a FPGA or similar programmable elements, the social network detection server may provide one or more of the features described processing without processing computer-executable instructions but instead by configuring the FPGA or similar programmable element to perform the recited features. Although described herein primarily with respect to digital technology, a social network detection server may also include primarily analog components. For example, some or all of the social network game play information processing features described herein may be implemented in analog circuitry or mixed analog and digital circuitry.

The elements of a method, process, routine, or algorithm described in connection with the embodiments disclosed herein can be embodied directly in social network detection server hardware, in a software module executed by a device included in the social network detection server, or in a combination of the two. A social network detection software module can reside in RAM memory, flash memory, ROM memory, EPROM memory, EEPROM memory, registers, hard disk, a removable disk, a CD-ROM, or similar form of a non-transitory computer-readable storage medium. An exemplary storage medium can be coupled to the social network detection server such that the social network detection server can read information from, and write information to, the storage medium. In the alternative, the storage medium can be integral to the social network detection server. The social network detection server and the storage medium can reside in an ASIC. The ASIC can reside in a device configured to capture or process data such as a microphone, a smartphone, a set-top-box, a tablet computer, a desktop computer, or the like. In the alternative, the content enhancement system and the storage medium can reside as discrete components (e.g., sub-system) in a device configured to identify and maintain social network information as described herein.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

As used herein, the terms "determine" or "determining" encompass a wide variety of actions. For example, "determining" may include calculating, computing, processing, deriving, generating, obtaining, looking up (e.g., looking up in a table, a database or another data structure), ascertaining and the like via a hardware element without user intervention. Also, "determining" may include receiving (e.g., receiving information), accessing (e.g., accessing data in a memory) and the like via a hardware element without user intervention. Also, "determining" may include resolving, selecting, choosing, establishing, and the like via a hardware element without user intervention.

As used herein, the terms "provide" or "providing" encompass a wide variety of actions. For example, "providing" may include storing a value in a location of a storage device for subsequent retrieval, transmitting a value directly to the recipient via at least one wired or wireless communication medium, transmitting or storing a reference to a value, and the like. "Providing" may also include encoding, decoding, encrypting, decrypting, validating, verifying, and the like via a hardware element.

As used herein, the term "message" encompasses a wide variety of formats for communicating (e.g., transmitting or receiving) information. A message may include a machine readable aggregation of information such as an XML document, fixed field message, comma separated message, or the like. A message may, in some implementations, include a signal utilized to transmit one or more representations of the information. While recited in the singular, it will be understood that a message may be composed, transmitted, stored, received, etc. in multiple parts.

As used herein a "user interface" (also referred to as an interface, an interactive user interface, a graphical user interface or a UI) may refer to a network based interface including data fields and/or other controls for receiving input signals or providing electronic information and/or for providing information to the user in response to any received input signals. A UI may be implemented in whole or in part using technologies such as hyper-text mark-up language (HTML), Flash, Java, .net, web services, and rich site summary (RSS). In some implementations, a UI may be included in a stand-alone client (for example, thick client, fat client) configured to communicate (e.g., send or receive data) in accordance with one or more of the aspects described.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

The invention claimed is:

1. A system for providing a gaming service comprising:
a data store storing specific computer-executable instructions; and
at least one computing device in communication with the data store, the at least one computing device including a processor that executes the specific computer-executable instructions to cause the system to at least:
receive social network information for a first player of a game, wherein the social network information indicates a connection between the first player of the game and at least one other player of the game, wherein the connection identifies a social network service through which the connection is established;
receive game play information associated with the game executing on a player device of the first player during a gaming session;
identify a compatibility profile for the game, the compatibility profile identifying a portion of the game play information for generating a compatibility score, wherein the compatibility score indicates a level of compatibility of a first player of the game with a second player of the game, wherein the compatibility profile identifies the portion of the game play information from the gaming session associated with the first player and with the second player, and wherein the portion of the game play information includes information received from a player device used during the gaming session to play the game;
generate the compatibility score using the portion of the game play information, wherein the portion of the game play information is identified by the compatibility profile for the game;
determine that the compatibility score corresponds to a compatibility score threshold;
identify a compatible social networking service external to the game based at least in part on a comparison of social networking services identified in a profile of the first player and a profile of the second player;
cause presentation of a message to the first player identifying a compatible connection with the second player, wherein the compatible connection is associated with the compatible social networking service accessed by the first player and the second player;
receive a confirmation for the compatible connection from the first player; and
update the social network information to include the compatible connection between the first player and the second player.

2. The gaming system of claim 1, wherein the instructions further cause the system to at least transmit an invitation message to the second player to establish the compatible connection via the social networking service, the invitation message including content generated based at least in part on the game play information.

3. The gaming system of claim 1, wherein the game play information identifies: (i) the second player included in the gaming session, and (ii) a result of the gaming session.

4. The gaming system of claim 1, wherein the compatibility profile includes: (i) information for generating the compatibility score from the portion of the game play information, and (ii) the compatibility score threshold.

5. A system comprising:
a data store storing specific computer-executable instructions; and
at least one computing device in communication with the data store, the at least one computing device including a processor that executes the specific computer-executable instructions to cause the system to at least:
receive social network information for a first player of a game, wherein the social network information indicates a connection between the first player of the game and at least one other player of the game, wherein the connection identifies a social network service through which the connection is established;
receive game play information for a session of play of the game, wherein the session is played by the first player and a second player;
determine that the game play information indicates that the first player and the second player of the game are compatible based at least in part on a portion of the game play information, wherein the portion of the game play information is identified by a compatibility profile for the game;
identify a compatible service based at least in part on a comparison of services associated with a profile of the first player maintained by the game and a profile of the second player maintained by the game;
confirm a compatible connection between the first player and the second player, wherein the compatible connection is associated with the compatible service accessed by the first player and the second player; and
update the social network information to include the compatible connection between the first player of the game and the second player.

6. The system of claim 5, wherein the instructions further cause the system to at least:
generate a compatibility metric for the first player and the second player based at least in part on the game play information; and
determine that the game play information indicates the first player and the second player are compatible based at least in part on a correlation between the compatibility metric and a compatibility metric threshold.

7. The system of claim 5, wherein the instructions further cause the system to at least transmit an invitation message to the second player to establish the connection via the compatible service.

8. The system of claim 7, wherein the instructions further cause the system to at least generate content for the invitation message based at least in part on the game play information.

9. The system of claim 5, wherein the instructions further cause the system to at least:
input game play information for the first player and the second player to an artificial neural network model;
input a player identifier for the first player and a player identifier for the second player to the artificial neural network model;
store the output of the artificial neural network model as a compatibility score indicating that the first player and the second player are compatible; and
determine that the game play information indicates that the first player and the second player are compatible based at least in part on a correlation between the compatibility score and a compatibility score threshold.

10. The system of claim 9, wherein the instructions further cause the system to at least:
receive historical game play information for the game; and
generate the artificial neural network model using the historical game play information and the social network information as training data.

11. The system of claim 5, wherein the instructions further cause the system to at least:
cause presentation of a message to the first player identifying the compatible connection with the second player; and receive a confirmation for the compatible connection from the first player.

12. The system of claim 11, wherein the instructions further cause the system to at least:
   establish a communication channel with a device executing the game, wherein the game play information is received via the communication channel; and
   transmit a control message via the communication channel, the control message causing presentation of the message via the device.

13. The system of claim 5, wherein the game play information comprises at least one of: a group of players playing the game together, a result of a game play for the group of players, hardware used by one or more players in the group of players, a game preference for one or more players in the group of players, or a game feature accessed by one or more players in the group of players.

14. A computer-implemented method comprising:
   under control of at least one computing device executing specific computer-executable instructions,
   receiving social network information for a first player of a game, wherein the social network information indicated a connection between the first player of the game and at least one other player of the game, wherein the connection identifies a social network service through which the connection is established;
   receiving game play information for a session of play of the game, wherein the game play information includes: (i) first hardware information from a first device used by the first player during the session and, (ii) second hardware information from a second device used by a second player during the session;
   determining that the game play information indicates that the first player and the second player of the game are compatible based at least in part on a portion of the game play information, wherein the portion of the game play information is identified by a compatibility profile for the game;
   identifying a compatible service based at least in part on a comparison of services associated with a profile of the first player maintained by the game and a profile of the second player maintained by the game; and
   updating the social network information to include a connection between the first player of the game and the second player via the compatible service.

15. The computer-implemented method of claim 14, further comprising transmitting an invitation message to the second player to establish the connection via the compatible service.

16. The computer-implemented method of claim 15, further comprising generating content for the invitation message based at least in part on the game play information.

17. The computer-implemented method of claim 14, further comprising:
   inputting game play information for the first player and the second player to an artificial neural network model;
   inputting a player identifier for the first player and a player identifier for the second player to the artificial neural network model;
   storing the output of the artificial neural network model as a compatibility score indicating that the first player and the second player are compatible; and
   determining that the game play information indicates that the first player and the second player are compatible based at least in part on a correlation between the compatibility score and a compatibility score threshold.

18. The computer-implemented method of claim 17, further comprising:
   receiving historical game play information for the game; and
   generating the artificial neural network model using the historical game play information and the social network information as training data.

19. The computer-implemented method of claim 14, further comprising:
   establishing a communication channel with a device executing the game, wherein the game play information is received via the communication channel; and
   transmitting a control message via the communication channel, the control message causing presentation of a message to the first player, wherein the message indicates compatibility with the second player.

20. The computer-implemented method of claim 19, further comprising receiving a confirmation of the compatibility from the first player, wherein updating the social network information is performed in response to receiving the confirmation.

* * * * *